United States Patent
Li et al.

(10) Patent No.: US 10,327,166 B2
(45) Date of Patent: Jun. 18, 2019

(54) METHOD AND APPARATUS FOR MONITORING RADIO LINK QUALITY

(71) Applicant: Telefonaktiebolaget LM Ericsson (publ), Stockhom (SE)

(72) Inventors: Shaohua Li, Beijing (CN); Jianfeng Wang, Beijing (CN)

(73) Assignee: TELEFONAKTIEBOLAGET LM ERICSSON, Stockholm (SE)

( * ) Notice: Subject to any disclaimer, the term of this patent is extended or adjusted under 35 U.S.C. 154(b) by 0 days.

(21) Appl. No.: 15/565,619

(22) PCT Filed: Apr. 21, 2015

(86) PCT No.: PCT/CN2015/077084
§ 371 (c)(1),
(2) Date: Oct. 10, 2017

(87) PCT Pub. No.: WO2016/168985
PCT Pub. Date: Oct. 27, 2016

(65) Prior Publication Data
US 2018/0084446 A1    Mar. 22, 2018

(51) Int. Cl.
*H04W 24/08* (2009.01)
*H04B 17/309* (2015.01)
(Continued)

(52) U.S. Cl.
CPC .......... *H04W 24/08* (2013.01); *H04B 7/0617* (2013.01); *H04B 17/309* (2015.01); *H04W 76/19* (2018.02); *Y02D 70/00* (2018.01)

(58) Field of Classification Search
CPC ... H04W 24/08; H04B 17/309; H04B 7/0617; Y02D 70/00
See application file for complete search history.

(56) References Cited

U.S. PATENT DOCUMENTS

2010/0273499 A1* 10/2010 van Rensburg ... H04W 72/1231
455/450
2014/0043988 A1    2/2014 Chen et al.
(Continued)

FOREIGN PATENT DOCUMENTS

CN    101868988 A    10/2010
CN    104184537 A    12/2014
(Continued)

OTHER PUBLICATIONS

International Preliminary Report on Patentability for Application No. PCT/CN2015/077084, dated Nov. 2, 2017, 6 pages.
(Continued)

*Primary Examiner* — Luat Phung
(74) *Attorney, Agent, or Firm* — Nicholson De Vos Webster & Elliott LLP

(57) ABSTRACT

Embodiments propose an efficient solution for radio link quality monitoring by a terminal device under coverage of a plurality of beams. Particularly, one embodiment includes a method for monitoring a radio link quality at a terminal device under coverage of a plurality of beams. The method comprises determining a radio link quality for each of beams associated with the terminal device based on a reference signal specific to that beam and then deciding the radio link quality of a radio link directed to the terminal device based on the determined radio link qualities. Another embodiment includes a method at a base station for facilitating radio link quality monitoring of a terminal device under coverage of a plurality of beams. The method comprises configuring an association between the plurality of beams and the terminal device and then informing the configured association to the terminal device. Corresponding apparatuses are further provided.

14 Claims, 7 Drawing Sheets

(51) Int. Cl.
*H04B 7/06* (2006.01)
*H04W 76/19* (2018.01)

(56) References Cited

U.S. PATENT DOCUMENTS

| 2014/0146863 | A1* | 5/2014 | Seol | H04B 7/0456 |
| | | | | 375/224 |
| 2015/0282122 | A1* | 10/2015 | Kim | H04L 25/03898 |
| | | | | 370/329 |
| 2017/0215117 | A1* | 7/2017 | Kwon | H04B 7/04 |
| 2018/0042000 | A1* | 2/2018 | Zhang | H04B 7/04 |

FOREIGN PATENT DOCUMENTS

| JP | 2006211366 A | 8/2006 |
| JP | 2011523819 A | 8/2011 |
| JP | 2014093650 A | 5/2014 |
| RU | 2325033 C2 | 5/2008 |
| RU | 2378758 C2 | 1/2010 |

OTHER PUBLICATIONS

International Search Report and the Written Opinion for Application No. PCT/CN2015/077084, dated Feb. 2, 2016, 11 pages.
Decision to Grant a Patent for Invention from foreign counterpart Russian Patent Application No. 2017134944, dated Sep. 4, 2018, 17 pages.
Office Action and Search Report from foreign counterpart Russian Patent Application No. 2017134944, dated May 14, 2018, 15 pages.
Extended European Search Report for Application No. 15889474.1, dated Oct. 22, 2018, 10 pages.
Huawei., et al., "Cell-association enhancements for EBF/FD-MIMO," Feb. 9-13, 2015, 3GPP TSG RAN WG1, R1-150058, Retrieved from http://www.3gpp.org/ftp/Meetings_3GPP_SYNC/RAN1/Docs on Feb. 8, 2015, 2 pages.
Office Action from foreign counterpart Korean Patent Application No. 10-2017-7033187, dated Dec 2, 2018, 6 pages.
Notice of Reasons for Rejection from foreign counterpart Japanese Patent Application No. 2017-555315, dated Jan. 8, 2019, 5 pages.

* cited by examiner

METHOD AND APPARATUS FOR MONITORING RADIO LINK QUALITY

CROSS-REFERENCE TO RELATED APPLICATIONS

This application is a National stage of International Application No. PCT/CN2015/077084, filed Apr. 21, 2015, which is hereby incorporated by reference.

TECHNICAL FIELD

The non-limiting and exemplary embodiments of the present disclosure generally relate to wireless communications, and specifically to a method, an apparatus, and a computer program for monitoring a radio link quality at a terminal device under coverage of a plurality of beams and to a method, an apparatus, and a computer program for facilitating radio link quality monitoring of a terminal device under coverage of a plurality of beams.

BACKGROUND

This section introduces aspects that may facilitate better understanding of the present disclosure. Accordingly, the statements of this section are to be read in this light and are not to be understood as admissions about what is in the prior art or what is not in the prior art.

In a Third Generation Partnership Project (3GPP)-Long Term Evolution (LTE) network, a user equipment (UE) needs to perform measurement on its serving cell (also known as a primary cell, PCell) so as to monitor the serving cell performance. This is called as radio link monitoring (RLM) or RLM related measurement in LTE, where the downlink radio link quality of the serving cell is monitored based on a cell-specific reference signal for the purpose of indicating out-of-synchronization (OOS) status and/or in-synchronization (IS) status to higher layers.

In order to indicate OOS and IS statuses, according to the 3GPP standard, i.e. 3GPP TS 36.133 V12.5.0, a UE shall estimate the downlink radio link quality and compare it to thresholds Qout or Qin. The threshold Qout is defined as the level at which the downlink radio link cannot be reliably received and shall correspond to 10% block error rate (BLER) of a hypothetical Physical Downlink Control CHannel (PDCCH) transmission taking into account the Physical Control Format Indicator CHannel (PCFICH) errors with transmission parameters specified in Table 7.6.1-1 of 3GPP TS 36.133 V12.5.0. When the estimated BLER over an evaluation period is bigger than Qout, an OOS indication is generated. The threshold Qin is defined as the level at which the downlink radio link quality can be significantly more reliably received than at Qout and shall correspond to 2% BLER of a hypothetical PDCCH transmission taking into account the PCFICH errors with transmission parameters specified in Table 7.6.1-2 of 3GPP TS 36.133 V12.5.0. When the estimated BLER over an evaluation period is smaller than Qin, an IS indication is generated. Table 7.6.1-1 and Table 7.6.1-2 will not be represented herein for the sake of brevity. The UE may declare radio link failure (RLF) when consecutive IS indications less than a certain number are detected within a predetermined time period. This time period is started after detection of a certain number of consecutive OOS indications.

According to the 3GPP standard, e.g. 3GPP TS 36.213 V11.7.0, in non-Discontinuous Reception (DRX) operation, the downlink link quality for OOS and IS is estimated over evaluation periods as specified in 3GPP TS 36.133 V12.5.0, for example 200 ms and 100 ms, respectively. In DRX mode operation, the downlink link quality for OOS and IS is estimated over the same evaluation periods as specified in 3GPP TS 36.133 V12.5.0, which may be adjusted with a DRX cycle. The estimated radio link quality may be filtered not only on the physical layer, but also on higher layers in the evaluation period based on some configured parameters. This increases the reliability of radio link failure (RLF) detection and thus avoids unnecessary radio link failure and consequent Radio Resource Control (RRC) re-establishment.

An advanced technology with multiple antennas has been proposed for the existing wireless communications systems, which can improve coverage with beamforming and significantly increase overall system capacity with spatial multiplexing. The beamforming, where multiple antenna elements are used to form narrow beams, is efficient means for improving both data rates and capacity; while the spatial multiplexing, where propagation properties are exploited to provide multiple data streams simultaneously to one or more terminals, is another important technique for the multi-antenna technology.

With the further development of wireless communications technology, a communications network with massive beams serving a UE may appear. In such a network, the existing solution for monitoring radio link quality may not be applicable anymore due to more beams being involved.

SUMMARY

Various embodiments of the present disclosure mainly aim at providing an efficient solution for radio link quality monitoring by a terminal device under coverage of a plurality of beams. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for monitoring a radio link quality at a terminal device. The terminal device is under coverage of a plurality of beams from at least one base station. The method comprises determining a radio link quality for each of beams associated with the terminal device among the plurality of beams, based on a reference signal specific to that beam. The method also comprises deciding the radio link quality of a radio link directed to the terminal device based on the determined radio link qualities.

In an embodiment, the radio link quality of the radio link may be decided as failure in the case that the radio link quality for each of the associated beams is determined as failure, or the radio link qualities for one or more beams selected from the associated beams are determined as failure.

In another embodiment, the radio link quality for each of the associated beams may be determined by the following operations: estimating a value of a first performance parameter based on measurement on the reference signal specific to that beam; generating a first indication, if the estimated value of the first performance parameter is bigger than a first threshold; estimating a value of a second performance parameter based on measurement on the reference signal specific to that beam; generating a second indication, if the estimated value of the second performance parameter is smaller than a second threshold; and then determining the radio link quality for that beam based on the first indication and the second indication.

In a further embodiment, the first performance parameter and the second performance parameter may be a block error rate.

In a second aspect of the present disclosure, there is provided a method for facilitating radio link quality monitoring of a terminal device. The method is performed at a base station and the terminal device is under coverage of a plurality of beams at least from the base station. The method comprises configuring an association between the plurality of beams and the terminal device and then informing the configured association to the terminal device.

In an embodiment, the configured association may associate any of the following with the terminal device: all of the plurality of beams or one or more beams, among the plurality of beams, each having a channel quality higher than a predetermined channel quality threshold.

In another embodiment, the plurality of beams may come from the base station and at least one other base station. In this embodiment, the configured association may associate a first subset of beams from the base station and a second subset of beams from the at least one other base station with the terminal device.

In a further embodiment, the first subset may comprise one or more beams from the base station each having a channel quality higher than a first predetermined channel quality threshold, while the second subset may comprise one or more beams from the at least one other base station each having a channel quality higher than a second predetermined channel quality threshold.

In a third aspect of the present disclosure, there is provided an apparatus for monitoring a radio link quality at a terminal device. The apparatus may be embodied as the terminal device or a part thereof, or an apparatus independent from the terminal device. The terminal device is under coverage of a plurality of beams from at least one base station. The apparatus comprises a determining unit and a deciding unit. The determining unit is configured to determine a radio link quality for each of beams associated with the terminal device among the plurality of beams, based on a reference signal specific to that beam. The deciding unit is configured to decide the radio link quality of a radio link directed to the terminal device based on the determined radio link qualities.

In a fourth aspect of the present disclosure, there is provided an apparatus for facilitating radio link quality monitoring of a terminal device. The apparatus may be embodied as a base station or a part thereof, or an apparatus independent from the base station. The terminal device is under coverage of a plurality of beams at least from the base station. The apparatus comprises an association configuring unit and an informing unit. The association configuring unit is configured to configure an association between the plurality of beams and the terminal device. The informing unit is configured to inform the configured association to the terminal device.

In a fifth aspect of the present disclosure, there is provided an apparatus for monitoring a radio link quality at a terminal device. The apparatus may be embodied as the terminal device or a part thereof, or an apparatus independent from the terminal device. The terminal device is under coverage of a plurality of beams from at least one base station. The apparatus comprises a processor and a memory. The memory contains instructions executable by the processor, whereby the apparatus is operative to perform the method according to the first aspect of the present disclosure.

In a sixth aspect of the present disclosure, there is provided an apparatus for facilitating radio link quality monitoring of a terminal device. The apparatus may be embodied as a base station or a part thereof, or an apparatus independent from the base station. The terminal device is under coverage of a plurality of beams at least from the base station. The apparatus comprises a processor and a memory. The memory contains instructions executable by the processor, whereby the apparatus is operative to perform the method according to the second aspect of the present disclosure.

In a seventh aspect of the present disclosure, there is provided an apparatus for monitoring a radio link quality at a terminal device. The apparatus may be embodied as the terminal device or a part thereof, or an apparatus independent from the terminal device. The terminal device is under coverage of a plurality of beams from at least one base station. The apparatus comprises processing means adapted to perform the method according to the first aspect of the present disclosure.

In an eighth aspect of the present disclosure, there is provided an apparatus for facilitating radio link quality monitoring of a terminal device. The apparatus may be embodied as a base station or a part thereof, or an apparatus independent from the base station. The terminal device is under coverage of a plurality of beams at least from the base station. The apparatus comprises processing means adapted to perform the method according to the second of the present disclosure.

In a ninth aspect of the present disclosure, there is provided a computer program. The computer program comprises instructions which, when executed on at least one processor, cause the at least one processor to carry out the method according to the first aspect of the present disclosure.

In a tenth aspect of the present disclosure, there is provided a computer program. The computer program comprises instructions which, when executed on at least one processor, cause the at least one processor to carry out the method according to the second aspect of the present disclosure.

According to the various aspects and embodiments as mentioned above, an efficient solution is provided for monitoring a radio link quality at a terminal device under coverage of a plurality of beams. By virtue of this solution, the radio link quality can be monitored at a terminal device on a beam level. Thus, it is possible to decide radio link quality of a radio link directed to the terminal device in consideration of the determined radio link qualities of desired beams so that the possibility of frequent indication or report of ratio link failure that may be caused by movement of the terminal device can be reduced. Since RRC states need to be changed and a connection re-establishment procedure needs to be initiated whenever radio link failure occurs, frequent changing of RRC states and frequent initiation of the connection re-establishment procedure may be reduced or avoided according to this solution.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various drawings indicate like elements.

DETAILED DESCRIPTION

Figure 1:
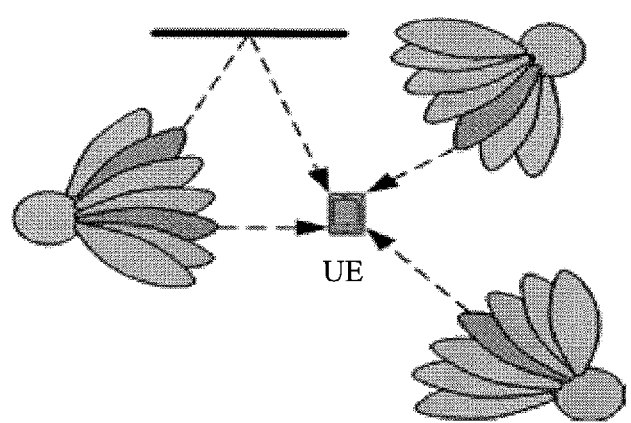
FIG. 1 shows an example that a UE is served by massive beams.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "uncluding", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may also refer to eNB, eNodeB, NodeB or base transceiver station (BTS) etc. depending on the technology and terminology used. Likewise, the term "terminal device" or UE used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. Hereafter, the terms "terminal device" and "UE" will be used interchangeably.

In a next or higher generation cellular communications system, advanced antennas with massive numbers of elements (known as massive Multiple Input Multiple Output, MIMO) can be used to generate massive beams in the system. FIG. 1 shows an example that a UE is served by massive beams.

In addition, the next or higher generation cellular communications systems require a drastic reduction of energy consumption in transmission, which is sometimes referred to as "ultra-lean transmission." The ultra-lean transmission may not only result in an energy-efficient network, which translates into a lower operational cost, but also reduce the overall interference level in the network. This is a critical enabler for very dense local-area deployments because end-user performance would otherwise be limited by interference at low-to-medium loads. In order to avoid residual inter-cell interference and energy consumption, "always-on" transmission with static reference signals and channels are not required any more for the ultra-lean transmission.

Without "always-on" reference signals in the next or higher generation communications systems, in order to support transmission with massive beams, the self-contained transmission needs to be satisfied with beam-specific and UE-specific reference signals. Therefore, to monitor a radio link for basic system information transmission, the RLM may also be beam-specific. It may be a simple extension of the current LTE specification. However, due to the massive narrow beams with massive MIMO, if a UE moves as usual, the radio link quality would not be stable, such that OOS and IS will be interchanged very frequently.

Furthermore, there are serious actions on system states along with the OOS and IS interchanging. If the radio link directed to a UE is determined as failure based on estimation of the radio link quality as mentioned in the Background section, the UE needs to change RRC states and perform actions upon leaving RRC_CONNECTED and/or initiate the connection re-establishment procedure. The frequent interchanging will make the UE to frequently perform RRC state changing and/or the re-establishment procedure, which obviously is not desirable.

In order to solve some of the above mentioned problems, embodiments of the present disclosure propose a new solution for monitoring a radio link quality at a terminal device under coverage of a plurality of beams, which will be detailed with reference to FIGS. 2-8.

Figure 2:
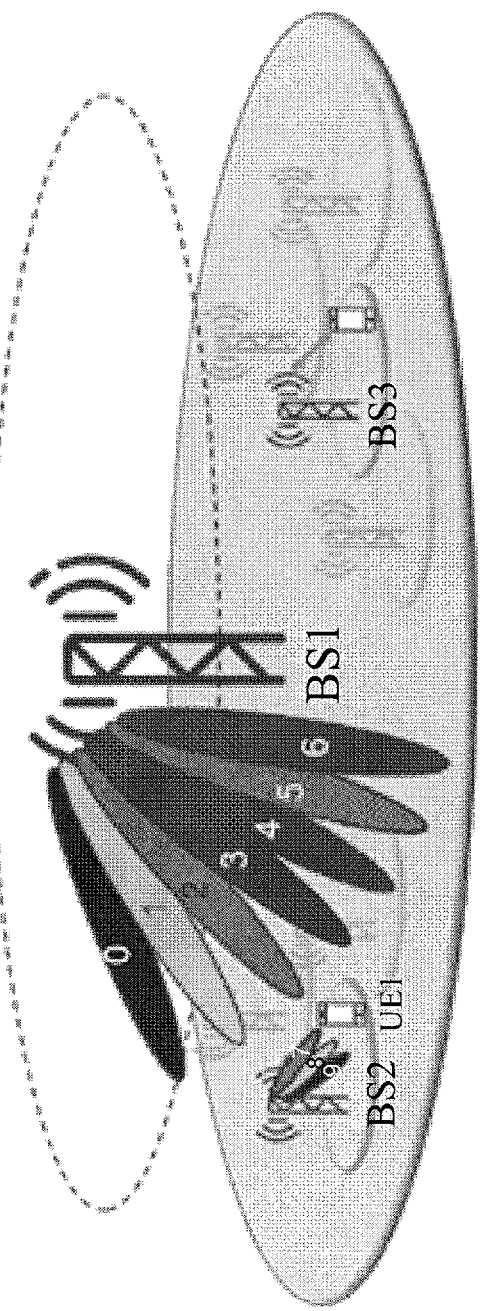
FIG. 2 illustrates an example network that comprises a macro base station BS1 and multiple small base stations.

FIG. 2 illustrates an example network that comprises a macro base station BS1 and multiple small base stations, e.g. BS2 and BS3. As illustrated, a terminal device UE1 is under coverage of a plurality of beams 0-9 from the macro base station BS1 and the small base station BS2, wherein the macro base station BS1 serves as an anchor base station that is primarily responsible for control and mobility of the terminal device UE1. Those skilled in the art shall understand that the anchor base station is not limited to the macro base station, and a small base station may also serve as the anchor base station for the terminal device UE1. For illustrative purposes, the concept and principle of several embodiments of the present disclosure will be described mainly in the network as shown in FIG. 2. Those skilled in the art will appreciate, however, that the concept and principle of the several embodiments of the present disclosure may be more generally applicable to other radio networks, as long as they involve communications with a plurality of beams, no matter where the plurality of beams come from.

Figure 3:
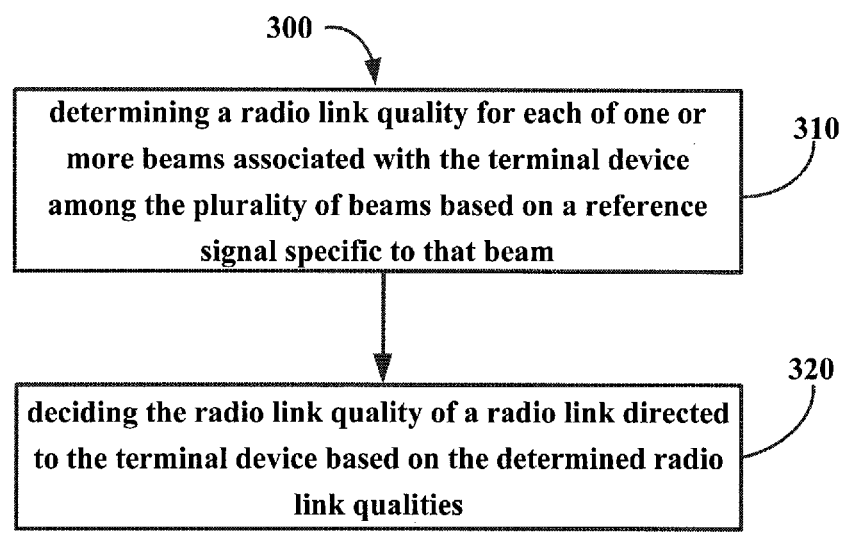
FIG. 3 illustrates a flowchart of a method for monitoring a radio link quality at a terminal device according to an embodiment of the present disclosure.

FIG. 3 illustrates a flowchart of a method 300 for monitoring a radio link quality at a terminal device according to an embodiment of the present disclosure. The terminal device, e.g. UE1 of FIG. 2, is under coverage of a plurality of beams from at least one base station, e.g. BS1 and BS2 of FIG. 2.

The method enters at block 310, in which a radio link quality is determined for each of one or more beams, which are associated with the terminal device, based on a reference signal specific to that beam. The one or more beams associated with the terminal device may be part or all of the plurality of beams. Then at block 320, the radio link quality of a radio link directed to the terminal device is decided based on the determined radio link qualities.

By virtue of method 300, it is possible to decide the radio link quality of a radio link directed to the terminal device in consideration of the determined radio link qualities of desired beams so that the possibility of frequent indication or report of ratio link failure that may be caused by movement of the terminal device can be reduced relative to the case that the decision of radio link failure is based on a single serving beam, in which radio link failure will be reported for the radio link once the current-serving beam fails. Accordingly, RRC states may be changed less frequently and thus the connection re-establishment procedure may be less initiated.

In particular, any reference signal associated with a beam may be used as the reference signal specific to that beam for determining the radio link quality. For example, the reference signal specific to the beam may comprise any of: a measurement-specific reference signal (MRS), which is used for measurement; a demodulation reference signal (DMRS), which is used for data demodulation; any other physical reference signal; or any combination of the reference signals.

In an embodiment that the plurality of beams are all from one base station, e.g. the anchor base station, the beams associated with the terminal device may comprise all of beams from this anchor base station, for example. This association may avoid frequent switching of the terminal device among base stations and thus avoid frequent triggering of the higher layer handover procedure. For another example, the beams associated with the terminal device may comprise one or more beams, among all beams from the anchor base station, each having a channel quality higher than a predetermined channel quality threshold. This association may relatively reduce the number of beams that are monitored by the terminal device and thus reduce implementation complexity of the terminal device.

In an embodiment that the plurality of beams are from both the anchor base station, e.g. the macro base station as shown in FIG. 2 and at least one other base station, e.g. the small base station BS2 as shown in FIG. 2, as an example, the beams associated with the terminal device may comprise all of the plurality of beams, e.g. beams 0-9 as shown in FIG. 2. As another example, the beams associated with the terminal device may comprise one or more beams, among the plurality of beams, each having a channel quality higher than a predetermined channel quality threshold. As a further example, the beams associated with the terminal device may comprise a first subset of beams from the anchor base station and a second subset of beams from the at least one other base station. In the latest example, each of the beams comprised in the first subset may have a channel quality higher than a first predetermined channel quality threshold, while each of the beams comprised in the second subset may have a channel quality higher than a second predetermined channel quality threshold. In this embodiment, the coverage area of the anchor base station may be extended when some of the at least other base station are located at the cell-edge of its coverage.

According to some embodiments of the present disclosure, the association of beams and the terminal device may be configured by the anchor base station, e.g. based on measurements reported by the terminal device, or predefined in the specification.

Figure 4:
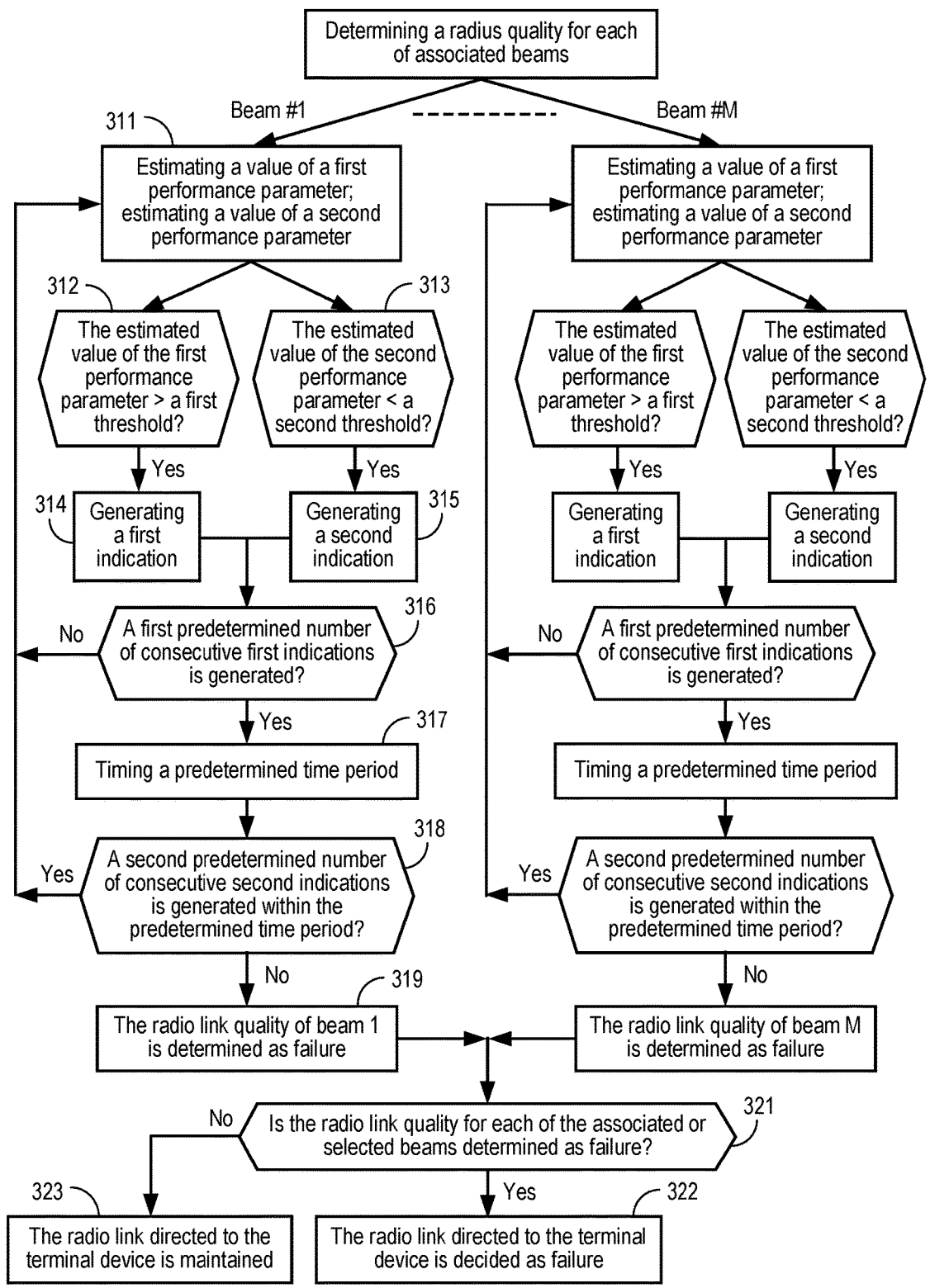
FIG. 4 illustrates a specific example of the method for monitoring a radio link quality at a terminal device according to an embodiment of the present disclosure.

FIG. 4 illustrates a specific example of the method 300 for monitoring a radio link quality at a terminal device according to an embodiment of the present disclosure, in which blocks 311-319 and other parallel blocks correspond to the operation in block 310 of FIG. 3 and blocks 321-323 correspond to the operation in block 320 of FIG. 3

Assuming that there are M beams associated with the terminal device in FIG. 4, the detailed operations of determining the radio link quality for each of the associated beams will be described with regard to beam #1 as an example. The operations of determining the radio link quality for other beams, i.e. #2-#M are the same and thus will not be repeated.

As for beam #1, a value of a first performance parameter may be estimated at block 311 based on measurement on a reference signal specific to that beam (beam #1). This estimation of the first performance parameter value may be performed on the basis of a hypothetical format, i.e. transmission parameters, of a first physical channel. Further, a value of a second performance parameter may also be estimated at block 311 based on measurement on the reference signal specific to that beam. This estimation of the second performance parameter value may be performed on the basis of a hypothetical format, i.e. transmission parameters, of a second physical channel. In various embodiments, the hypothetical formats of the first and second physical channels may be the same or different. The first and second performance parameters may be the same, e.g. a BLER or a signal to noise ratio of the corresponding physical channel. In the embodiment that the hypothetical formats of the first and second physical channels are the same and the first and second performance parameters are also the same, only one performance parameter value is actually estimated. Those skilled in that shall appreciate that the particular method for making the above estimation is well known in the art and implementation-related, and thus will not be detailed herein for the sake of brevity.

Subsequently, if the estimated value of the first performance parameter is bigger than a first threshold at block 312, then a first indication may be generated. In an example that the performance parameter is a BLER, the first threshold may be set as 10% for a hypothetical PDCCH transmission taking into account the PCFICH errors with transmission parameters specified in Table 7.6.1-1 of 3GPP TS 36.133 V12.5.0. In this example, when the estimated BLER value is bigger than 10%, then the first indication indicating OOS, which may be referred to as an OOS indication, will be generated.

Correspondingly, if the estimated value of the second performance parameter is smaller than a second threshold at block 313, then a second indication may be generated. In an example that the performance parameter is a BLER, the first threshold may be set as 2% for a hypothetical PDCCH transmission taking into account the PCFICH errors with transmission parameters specified in Table 7.6.1-2 of 3GPP TS 36.133 V12.5.0. In this example, when the estimated BLER value is smaller than 2%, then the second indication indicating IS, which may be referred to as an IS indication, will be generated.

Then, based on the first indication and the second indication, the radio link quality for beam #1 may be determined.

In one example, when a first predetermined number of consecutive OOS indications are generated, a timer for timing a predetermined time period may be started at block 317.

Afterwards, if a second predetermined number of consecutive IS indications are generated at block 318 during this predetermined time period, i.e. before the timer expires, then the radio link for beam #1 is maintained; otherwise the radio link quality for beam #1 is determined as failure at block 319.

Likewise, for each of the other beams #2-#M associated with the terminal device, the operations at blocks 311-319 will be performed. Then based on the determined radio link qualities for the associated beams, the radio link directed to the terminal device may be determined at block 321.

As an example, if the radio link for each of the associated beams of the terminal device is determined as failure, then the radio link directed to the terminal device will be decided as failure at block 322; otherwise, the radio link directed to the terminal device is maintained at block 323. In this example, the radio link quality is decided with regard to all associated beams so that radio link failure may be less frequently indicated or reported relative to the case that the decision of radio link failure is based on a single serving beam. Thus, the RRC state changing or connection re-establishment procedure may be less initiated.

As another example, the determination at block 321 may be based on the determined radio link qualities of one or more beams selected from the associated beams. In this example, the beams having the best radio link quality, e.g. whose previously estimated BLERs are lower than a certain threshold, may be selected. If the radio link for each of the selected beams is determined as failure, then the radio link directed to the terminal device will be decided as failure at block 322; otherwise, the radio link directed to the terminal device will be maintained at block 323. In such an example, the radio link quality is decided with regard to beams having the best radio link quality so that on one hand, radio link failure may be less frequently indicated or reported relative to the case that the decision of radio link failure is based on a single serving beam, and on the other hand, the number of beams that are monitored by the terminal device may be reduced and thus implementation complexity of the terminal device may be reduced accordingly.

Figure 5:
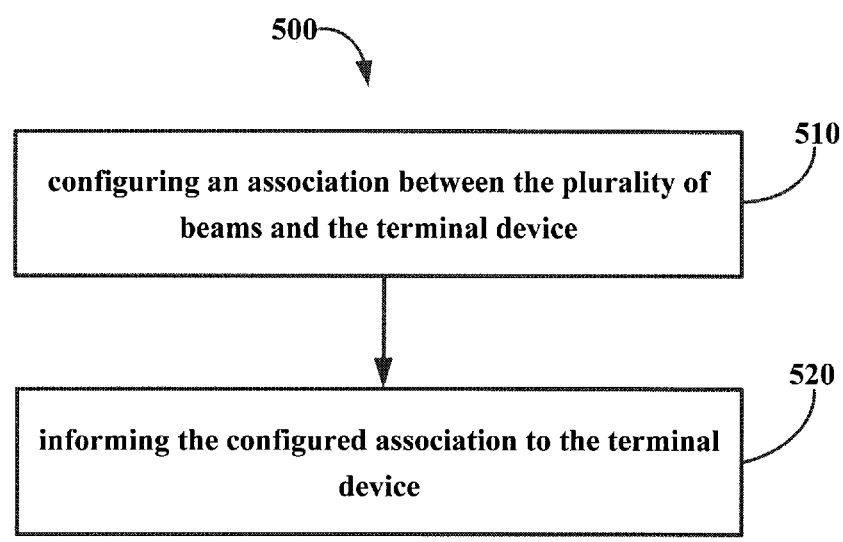
FIG. 5 illustrates a flowchart of a method for facilitating radio link quality monitoring of a terminal device according to an embodiment of the present disclosure.

FIG. 5 illustrates a flowchart of a method 500 for facilitating radio link quality monitoring of a terminal device according to an embodiment of the present disclosure. The method 500 is performed at a base station, e.g. an anchor base station, wherein the terminal device is under coverage of a plurality of beams which comes at least from the base station.

As shown in the method 500, firstly, an association between the plurality of beams and the terminal device is configured at the base station at block 510.

In an embodiment, the configured association may associate all of the plurality of beams with the terminal device. This association may avoid frequent switching of the terminal device among base stations and thus avoid frequent triggering of the higher layer handover procedure.

In another embodiment, the configured association may associate one or more beams, among the plurality of beams, each having a channel quality higher than a predetermined channel quality threshold with the terminal device. This association may relatively reduce the number of beams that are monitored by the terminal device and thus reduce implementation complexity of the terminal device. In these embodiments, the plurality of beams may be from the base station only or from both the base station and at least one other base station, e.g. the case as shown in FIG. 2.

In an embodiment that the plurality of beams come from both the base station and at least one other base station, the associated beams configured by the association may comprise a first subset of beams from the base station and a second subset of beams from the at least one other base station. In a further embodiment, the first subset may comprise one or more beams from the base station each having a channel quality higher than a first predetermined channel quality threshold, while the second subset may comprise one or more beams from the other base station each having a channel quality higher than a second predetermined channel quality threshold.

Subsequently, the configured association is informed to the terminal device at block 520. As an example, the configured association may be informed via low layer signaling and/or higher layer signaling. As another example, the association may be dynamically changed according to measurements reported by the terminal device. In this example, the configured association may be periodically informed or informed upon every change.

By virtue of the method 500, the beams from one or more base stations may be appropriately associated with a terminal device so that the terminal device may decide the radio link quality of a radio link directed to it with regard to desired beams rather than a single serving beam. Accordingly, the possibility of frequent indication or report of ratio link failure that may be caused by movement of the terminal device can be reduced. RRC states may be changed less frequently and thus the connection re-establishment procedure may be less initiated.

Figure 6:
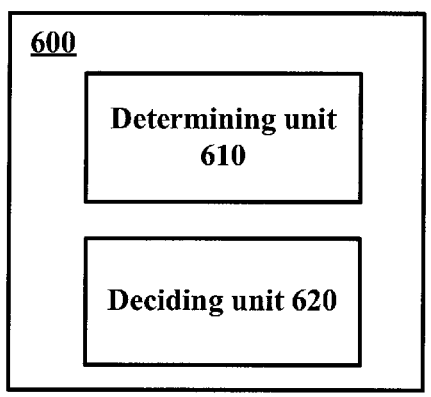
FIG. 6 illustrates a schematic block diagram of an apparatus for monitoring a radio link quality at a terminal device according to an embodiment of the present disclosure.

FIG. 6 illustrates a schematic block diagram of an apparatus 600 for monitoring a radio link quality at a terminal device according to an embodiment of the present disclosure. The terminal device is under coverage of a plurality of beams from at least one base station. The apparatus 600 may be embodied as the terminal device or a part thereof, or an apparatus independent from the terminal device.

Particularly, as illustrated in FIG. 6, the apparatus 600 comprises a determining unit 610 and a deciding unit 620. The determining unit 610 is configured to determine a radio link quality for each of one or more beams, which are associated with the terminal device, based on a reference signal specific to that beam. The one or more beams associated with the terminal device may be part or all of the plurality of beams. The deciding unit 620 is configured to decide the radio link quality of a radio link directed to the terminal device based on the determined radio link qualities.

In an embodiment, the deciding unit 620 may be configured to decide the radio link quality of the radio link as failure in the case that the radio link quality for each of the associated beams is determined as failure, or the radio link qualities of one or more beams selected from the associated beams are determined as failure.

In another embodiment, the determining unit 610 may be further configured to, for each of the associated beams: estimate a value of a first performance parameter based on measurement on the reference signal specific to that beam; generate a first indication, if the estimated value of the first performance parameter is bigger than a first threshold; estimate a value of a second performance parameter based on measurement on the reference signal specific to that beam; generate a second indication, if the estimated value of the second performance parameter is smaller than a second threshold; and then determine the radio link quality for that beam based on the generated first and second indications.

The above units 610 and 620 may be configured to implement corresponding operations or steps as described with reference to FIGS. 3 and 4, and thus will not be detailed herein for the sake of brevity.

Figure 7:
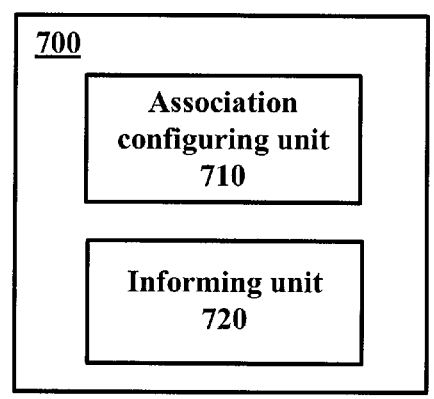
FIG. 7 illustrates a schematic block diagram of an apparatus for facilitating radio link quality monitoring of a terminal device according to an embodiment of the present disclosure.

FIG. 7 illustrates a schematic block diagram of an apparatus 700 for facilitating radio link quality monitoring of a terminal device according to an embodiment of the present disclosure. The terminal device is under coverage of a plurality of beams from at least a base station. The apparatus 700 may be embodied as the base station or a part thereof, or an apparatus independent from the base station, or part of another device.

Particularly, as illustrated in FIG. 7, the apparatus 700 comprises an association configuring unit 710 and an informing unit 720. The association configuring unit 710 is configured to configure an association between the plurality of beams and the terminal device. The informing unit 720 is configured to inform the configured association to the terminal device.

In an embodiment, the associated beams configured by the association configuring unit 710 may comprise all of the plurality of beams. In another embodiment, the associated beams configured by the association configuring unit 710 may comprise one or more beams, among the plurality of beams, each having a channel quality higher than a predetermined channel quality threshold.

In an embodiment that the plurality of beams come from both the base station and at least one other base station, e.g. the case as shown in FIG. 2, the associated beams configured by the association configuring unit 710 may comprise a first subset of beams from the base station and a second subset of beams from the at least one other base station. In a further embodiment, the first subset may comprise one or more beams from the base station each having a channel quality higher than a first predetermined channel quality threshold, while the second subset may comprise one or more beams from the other base station each having a channel quality higher than a second predetermined channel quality threshold.

As an example, the configured association may be informed to the terminal device by the informing unit 720 via low layer signaling and/or higher layer signaling. As another example, the association may be dynamically changed according to measurements reported by the terminal device. In this example, the configured association may be periodically informed or informed upon every change by the informing unit 720.

The above units 710 and 720 may be configured to implement corresponding operations or steps as described with reference to FIG. 5 and thus will not be detailed herein for the sake of brevity.

Figure 8:
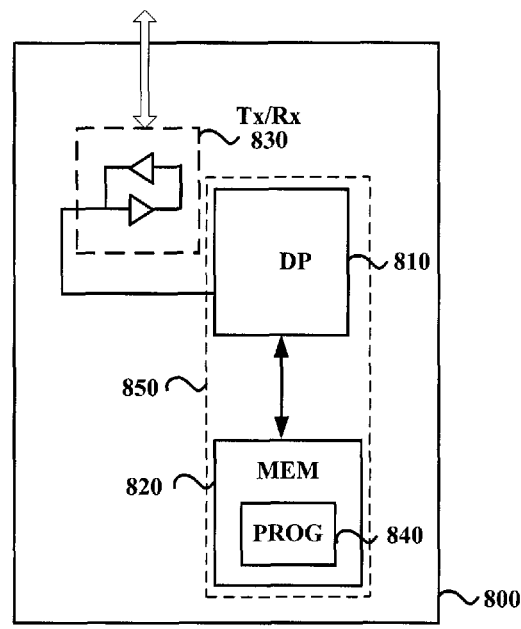
FIG. 8 illustrates a schematic block diagram of an apparatus according to embodiments of the present disclosure.

FIG. 8 illustrates a schematic block diagram of an apparatus 800 according to an embodiment of the present disclosure. The apparatus 800 may be embodied as a terminal device or a part thereof, e.g. UE 1 as shown in FIG. 2, or an apparatus independent from the terminal device. The apparatus 800 may also be embodied as a base station or a part thereof, e.g. BS1 as shown in FIG. 2, or an apparatus independent from the base station.

The apparatus 800 comprises at least one processor 810, such as a data processor (DP) and at least one memory (MEM) 820 coupled to the processor 810. The apparatus 800 may further comprise a transmitter TX and receiver RX 830 coupled to the processor 810 for establishing wireless communications with other apparatuses. The MEM 820 stores a program (PROG) 840. When the apparatus 800 is embodied as the terminal device or a part thereof, the PROG 840 may include instructions that, when executed on the associated processor 810, enable the apparatus 800 to operate in accordance with the embodiments of the present disclosure as described above with reference to FIGS. 3 and 4, for example to perform method 300. When the apparatus 800 is embodied as the base station or a part thereof, the PROG 840 may include instructions that, when executed on the associated processor 810, enable the apparatus 800 to operate in accordance with the embodiments of the present disclosure as described above with reference to FIG. 5, for example to perform method 500.

A combination of the at least one processor 810 and the at least one MEM 820 may form processing means 850. When the apparatus 800 is embodied as the terminal device or a part thereof, the processing means 850 may be adapted to implement the embodiments of the present disclosure as described above with reference to FIGS. 3 and 4; while the apparatus 800 is embodied as the base station or a part thereof, the processing means 850 may be adapted to implement the embodiments of the present disclosure as described above with reference to FIG. 5.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 810 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the present disclosure, and it is to be understood that modifications and variations may be resorted to without departing from the spirit and scope of the present disclosure as those skilled in the art readily understand. Such modifications and variations are considered to be within the scope of the present disclosure and the appended claims. The protection scope of the present disclosure is defined by the accompanying claims.

What is claimed is:

1. A method for monitoring a radio link quality at a terminal device under coverage of a plurality of beams from at least one base station, the method comprising:
   determining a radio link quality for each of beams associated with the terminal device among the plurality of beams, based on a reference signal specific to that beam, wherein the determining the radio link quality for that beam comprises generating a first indication and a second indication, each indication corresponding to a comparison between an estimated value of a performance parameter and a corresponding threshold, and wherein the radio link quality for that beam is determined based on the first indication and the second indication; and
   deciding the radio link quality of a radio link directed to the terminal device based on the determined radio link qualities.

2. The method according to claim 1, wherein the deciding the radio link quality of the radio link based on the determined radio link qualities comprises:
   deciding the radio link quality of the radio link as failure, if the radio link quality for each of the associated beams is determined as failure, or the radio link qualities for one or more beams selected from the associated beams are determined as failure.

3. The method according to claim 1, wherein the determining the radio link quality for each of the associated beams comprises:
   estimating a value of a first performance parameter based on measurement on the reference signal specific to that beam;
   generating the first indication, if the estimated value of the first performance parameter is bigger than a first threshold;
   estimating a value of a second performance parameter based on measurement on the reference signal specific to that beam;
   generating the second indication, if the estimated value of the second performance parameter is smaller than a second threshold; and
   determining the radio link quality for that beam based on the first indication and the second indication.

4. The method according to claim 3, wherein the first performance parameter and the second performance parameter are a block error rate.

5. The method of claim 4, wherein the block error rate is for a Physical Downlink Control Channel (PDCCH).

6. The method of claim 3, wherein determination of the radio link quality for that beam based on the first indication and second indication comprises:
   determining whether a first number of consecutive first indications are generated within a predetermined time period.

7. The method of claim 6, wherein determination of the radio link quality for that beam based on the first indication and second indication further comprises:
   determining whether a second number of consecutive second indications are generated within the predetermined time period; and
   determining that the radio link quality as good when the second number of consecutive second indications are generated.

8. The method of claim 1, wherein the radio link quality of the radio link directed to the terminal device is decided as failure when the each beam associated with the terminal device among the plurality of beams having the determined radio link quality as failure.

9. A method at a base station for facilitating radio link quality monitoring of a terminal device under coverage of a plurality of beams at least from the base station, the method comprising:
   configuring an association between the plurality of beams and the terminal device, wherein the plurality of beams are from the base station and at least one other base station, wherein the base station associates a first subset of beams from the base station with the terminal device, each of the first subset of beams having a channel quality higher than a first predetermined channel quality threshold, and wherein the base station associates a second subset of beams from the at least one other base station with the terminal device, each of the second subset of beams having a channel quality higher than a second predetermined channel quality threshold; and informing the configured association to the terminal device.

10. An apparatus for monitoring a radio link quality at a terminal device under coverage of a plurality of beams from at least one base station, the apparatus comprising:

a processor and a non-transitory storage medium that stores instructions, which when executed on the processor, cause the apparatus to:

determine a radio link quality for each of beams associated with the terminal device among the plurality of beams, based on a reference signal specific to that beam, wherein the determination of the radio link quality for that beam comprises generating a first indication and a second indication, each indication corresponding to a comparison between an estimated value of a performance parameter and a corresponding threshold, and wherein the radio link quality for that beam is determined based on the first indication and the second indication, and decide the radio link quality of a radio link directed to the terminal device based on the determined radio link qualities.

11. The apparatus according to claim 10, wherein the apparatus is to:

decide the radio link quality of the radio link as failure, if the radio link quality for each of the associated beams is determined as failure, or the radio link qualities of one or more beams selected from the associated beams are determined as failure.

12. The apparatus according to claim 10, wherein the apparatus is to, for each of the associated beams:

estimate a value of a first performance parameter based on measurement on the reference signal specific to that beam, generate the first indication, if the estimated value of the first performance parameter is bigger than a first threshold, estimate a value of a second performance parameter based on measurement on the reference signal specific to that beam, generate the second indication, if the estimated value of the second performance parameter is smaller than a second threshold, and determine the radio link quality for that beam based on the first indication and the second indication.

13. The apparatus according to claim 12, wherein the first performance parameter and the second performance parameter are a block error rate.

14. An apparatus for facilitating radio link quality monitoring of a terminal device under coverage of a plurality of beams from at least a base station, the apparatus comprising:

a processor and a non-transitory storage medium that stores instructions, which when executed on the processor, cause the apparatus to:

configure an association between the plurality of beams and the terminal device, wherein the plurality of beams are from the base station and at least one other base station, wherein the base station associates a first subset of beams from the base station with the terminal device, each of the first subset of beams having a channel quality higher than a first predetermined channel quality threshold, and wherein the base station associates a second subset of beams from the at least one other base station with the terminal device, each of the second subset of beams having a channel quality higher than a second predetermined channel quality threshold, and inform the configured association to the terminal device.

* * * * *